(12) United States Patent
Welchko et al.

(10) Patent No.: US 7,057,371 B2
(45) Date of Patent: Jun. 6, 2006

(54) INVERTER FOR ELECTRIC AND HYBRID POWERED VEHICLES AND ASSOCIATED SYSTEM AND METHOD

(75) Inventors: Brian Welchko, Torrance, CA (US); James M. Nagashima, Cerritos, CA (US); Khwaja M. Rahman, Torrance, CA (US)

(73) Assignee: General Motors Corporation, Detriot, MI (US)

( * ) Notice: Subject to any disclaimer, the term of this patent is extended or adjusted under 35 U.S.C. 154(b) by 0 days.

(21) Appl. No.: 10/827,115

(22) Filed: Apr. 19, 2004

(65) Prior Publication Data

US 2005/0231152 A1    Oct. 20, 2005

(51) Int. Cl.
*H02P 5/34* (2006.01)
(52) U.S. Cl. ...................... 318/801; 318/254; 318/138; 318/439; 318/700
(58) Field of Classification Search ............... 318/801, 318/254, 138, 439, 700, 767, 768; 320/101; 363/37; 307/29; 327/552; 323/10; 180/65.6
See application file for complete search history.

(56) References Cited

U.S. PATENT DOCUMENTS

| | | | |
|---|---|---|---|
| 6,242,883 B1 | 6/2001 | Strunk | |
| 6,359,412 B1 * | 3/2002 | Heglund | 318/701 |
| 6,577,087 B1 | 6/2003 | Su | |
| 6,617,822 B1 * | 9/2003 | Kirkpatrick | 320/101 |
| 2003/0107287 A1 * | 6/2003 | Nishimura et al. | 310/180 |

OTHER PUBLICATIONS

Brian A. Welchko and James M. Nagashima, "A Comparative Evaluation of Motor Drive Topologies for Low-Voltage, High-Power EV/HEV Propulsion Systems", IEEE International Symposium on Industrial Electronics, ISIE'03, Jun. 9-12, 2003, pp. 1-6.

Brian A. Welchko and James M. Nagashima, "The Influence of Topology Selection on the Design of EV/HEV Propulsion Systems", IEEE Power Electronics Letters, vol. 1, No. 2, Jun. 2003, pp. 36-40.

(Continued)

*Primary Examiner*—Karen Masih
(74) *Attorney, Agent, or Firm*—Christopher DeVries

(57) ABSTRACT

A hybrid/electric vehicle including a battery system connected to a DC charger, an inverter coupled to the battery system, and an electric AC motor coupled to the inverter. The motor has first, second and third stator windings corresponding to first, second and third phases of the motor. Each stator winding has first and second leads, and the inverter has a plurality of switches that are connected to provide current to the stator windings at the first and second leads.

18 Claims, 7 Drawing Sheets

OTHER PUBLICATIONS

Murray/McDonald/Davis/Cao/Spring, "Extremely Rugged MOSFET Technology with Ultra-low RDS(on) Specified for A Broad Range of EAR Conditions", International Rectifier, pp. 1-8.

Murray/Wood/Keskar/Chen/Guerra, "A 42V Inverter/Rectifier for ISA using Discrete Semiconductor Components", International Rectifier, Future Transportation Technology Conference, Aug. 2001, pp. 1-7.

Tolbert/Peng/Habetler, "Multilevel Inverters for Electric Vehicle Applications", WPET '98, Dearborn, Michigan, Oct. 22-23, 1998, pp. 79-84.

Tolbert/Peng/Adams/McKeever, "Multilevel Inverters for Large Automotive Electric Drives", All Electric Combat Vehicle Second International Conference, Jun. 8-12, 1997, pp. 1-6.

* cited by examiner

TABLE I
SYSTEM RATINGS FOR VARIOUS INVERTER CAPACITIES AND IPM MOTOR CONFIGURATIONS

| Configuration | Turns Ratio (pu) | Rated I (pu) | Magnet Flux (pu) | Corner Speed (rpm) | Torque at Corner (Nm) | P at Corner Speed (kW) | P at 3000 rpm (kW) | Inv. Switch kVA (pu) |
|---|---|---|---|---|---|---|---|---|
| Standard Inv. with Standard Motor. Case #1 | 1 | 1 | 1 | 700 | 155 | 10.1 | 7.0 | 1.00 |
| Cascaded Inv. with Adj. Turns Ratio Motor. Case #1 | $\sqrt{3}$ | $1/\sqrt{3}$ | 1 | 700 | 155 | 10.1 | 7.0 | 1.15 |
| Cascaded Inv. with Standard Motor. Case #2 | 1 | 1 | 1 | 1300 | 155 | 21.1 | 16.1 | 2.00 |
| Cascaded Inv. with Maximum Flux Motor. Case #3 | 1 | 1 | $\sqrt{3}$ | 1300 | 170 | 23.1 | 21.0 | 2.00 |
| Cascaded Inverter with Increased Flux and Adjusted Turns Ratio Motor. Case #4 | N = 4/3 | 1/N | $\sqrt{3}/N$ | 940 | 161 | 15.9 | 11.8 | 1.50 |

FIG. 8

INVERTER FOR ELECTRIC AND HYBRID POWERED VEHICLES AND ASSOCIATED SYSTEM AND METHOD

FIELD OF THE INVENTION

The present invention relates to electric and hybrid powered vehicles, and more particularly to inverters for electric and hybrid powered vehicles.

BACKGROUND OF THE INVENTION

Electric and hybrid powered vehicles (EV/HEV) may include a higher voltage bus, such as a 42 V bus. Integrated starter/alternators (ISA) have been used in low storage requirement applications such as light hybrid vehicles. In most ISA systems, a standard six-switch inverter topology that is illustrated in FIG. 1 is used.

The inverter 50 utilizes six switches 52 that selectively block the battery voltage $V_b$ of 42 V (=1 pu) and carry the rated peak phase current of the motor 54 (=1 pu). Employing space vector pulse width modulation (PWM), the inverter 50 produces a peak motor phase voltage of 0.578 pu in the linear region and 0.637 pu in a six-step mode when the motor is Y-connected. Although the Y-connection is illustrated in FIG. 1, the inverter 50 can also be used with a delta connection.

A useful measure of topology cost of the inverter is the switch utilization ratio (SUR). The SUR relates the required kVA of the silicon switches to the output volt-amperes that can be produced for a unity power factor load. Mathematically, this is:

$$(SUR) = \frac{(VA)_{3\text{-}phase}}{(\text{number of switches})V_{SW}I_{SW}} \quad (1)$$

where $V_{SW}$ and $I_{SW}$ are the switch voltage and current ratings. The inverter 50 of FIG. 1 has an SUR of 0.159.

SUMMARY OF THE INVENTION

The present teachings provide a hybrid/electric vehicle that includes a battery system connected to a DC charger, an inverter coupled to the battery system, and an electric AC motor coupled to the inverter. The motor has first, second and third stator windings corresponding to first, second and third phases of the motor. Each stator winding has first and second leads, and the inverter has a plurality of switches that are connected to provide current to the stator windings at the first and second leads.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 is a Table showing predicted system ratings for various inverter capacities and IPM motor configurations.

DETAILED DESCRIPTION OF THE PREFERRED EMBODIMENTS

Figure 1:
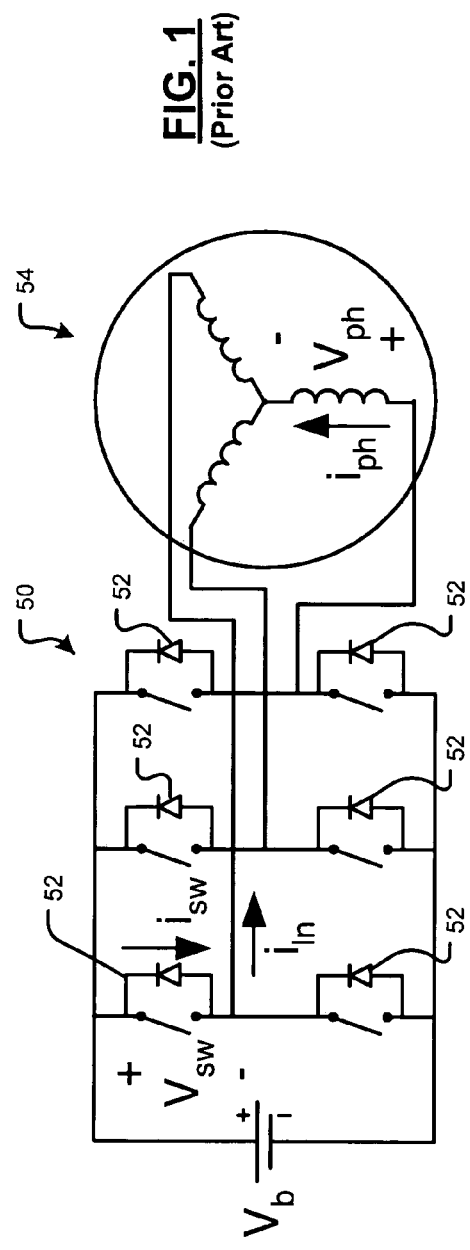
FIG. 1 is an inverter for an electric/hybrid vehicle according to the prior art.

The following description of the preferred embodiments is merely exemplary in nature and is in no way intended to limit the invention, its application, or uses. For purposes of clarity, the same reference numbers will be used in the drawings to identify similar elements.

Figure 2:
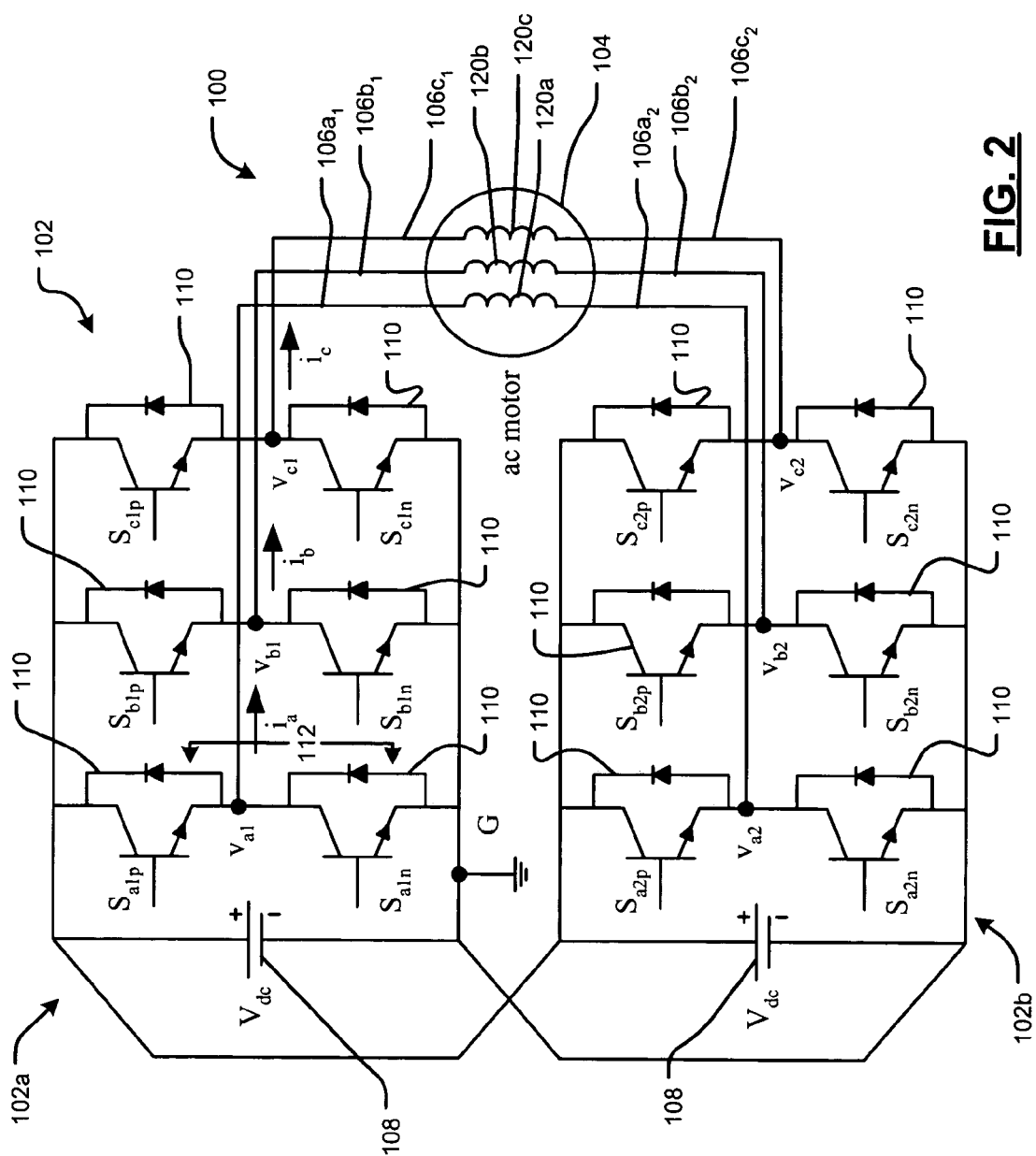
FIG. 2 is an electrical schematic of a cascaded inverter having connected DC links for an electric/hybrid vehicle according to the present invention.
Figure 5:
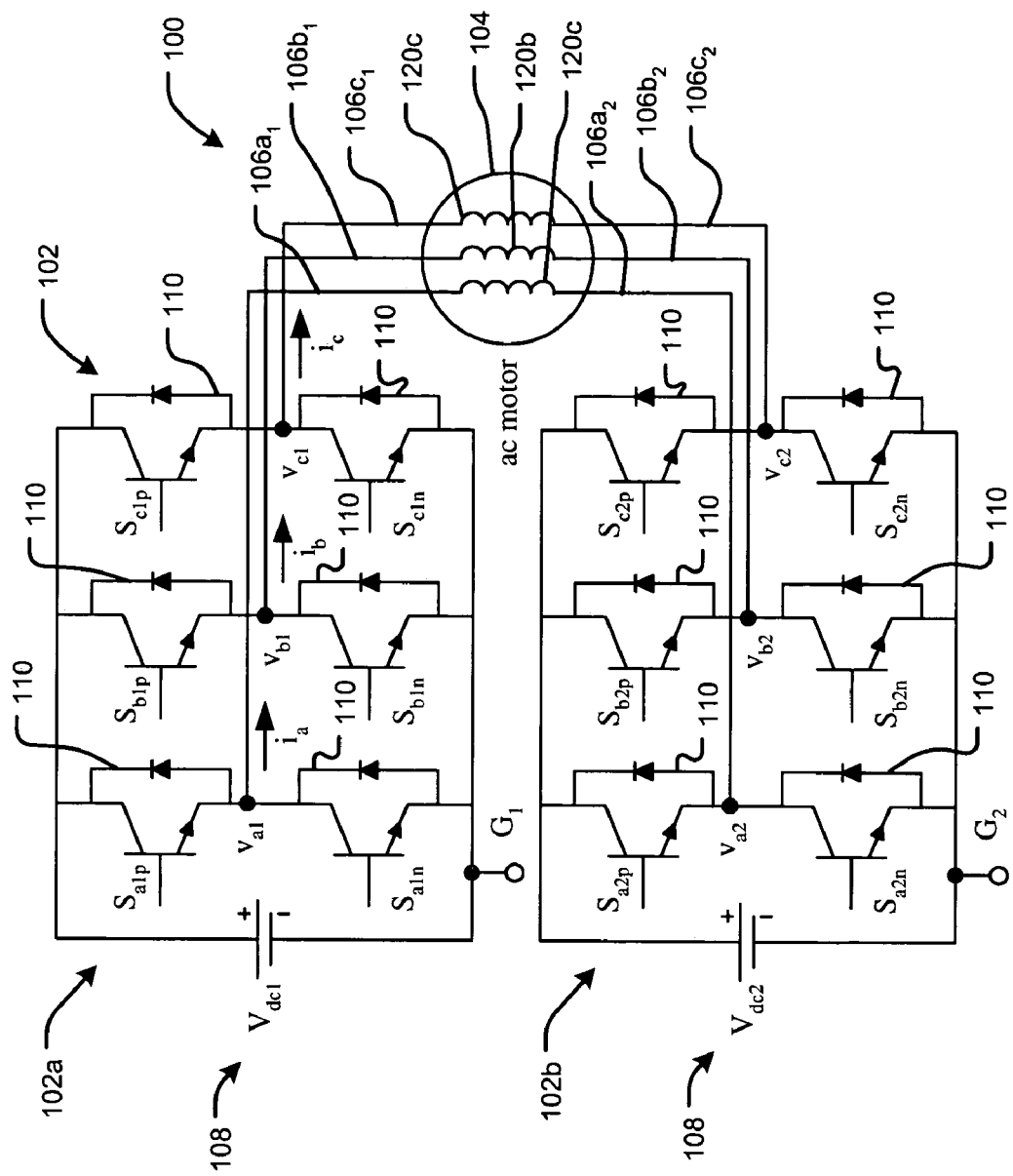
FIG. 5 is an electrical schematic of a cascaded inverter having separate DC links for an electric/hybrid vehicle according to the present invention.

Referring now to FIG. 2, an electric/hybrid vehicle (EV/HEV) system 100 employs a cascaded inverter 102 that drives an open winding machine or motor 104 having all of the stator leads $106a_1$, $106a_2$, $106b_1$, $106b_2$, $106c_1$, $106c_2$, available. For example, the machine 104 is an induction machine, an interior permanent magnet (IPM) machine, or other suitable machine. While a single (connected) DC 108 source is used in the cascaded inverter that is shown in FIG. 2, the battery pack in an EV/HEV can be partitioned into two DC sources 108 as shown in FIG. 5.

The cascaded inverter 102 includes first and second inverter subunits 102a, 102b, which are interconnected. Each inverter subunit 102a, 102b includes six semiconductor switches 110, for a total of 12 switches 110. The switches 110 are arranged in pairs, each pair defining one of the six legs 112 of the inverter 102 The switches 110 used for the EV/HEV application are typically IGBTs or MOSFETs, although other types of switches may be used. Each of the stator leads $106a_1$, $106a_2$, $106b_1$, $106b_2$, $106c_1$, $106c_2$, is connected to a leg 112. In particular, the opposite leads $106a_1$, $106a_2$, $106b_1$, $106b_2$, $106c_1$, $106c_2$, of each stator winding 120a, 120b, 120c are connected to respective legs 112 of the first and second inverter subunits 102a, 102b.

Figure 3:
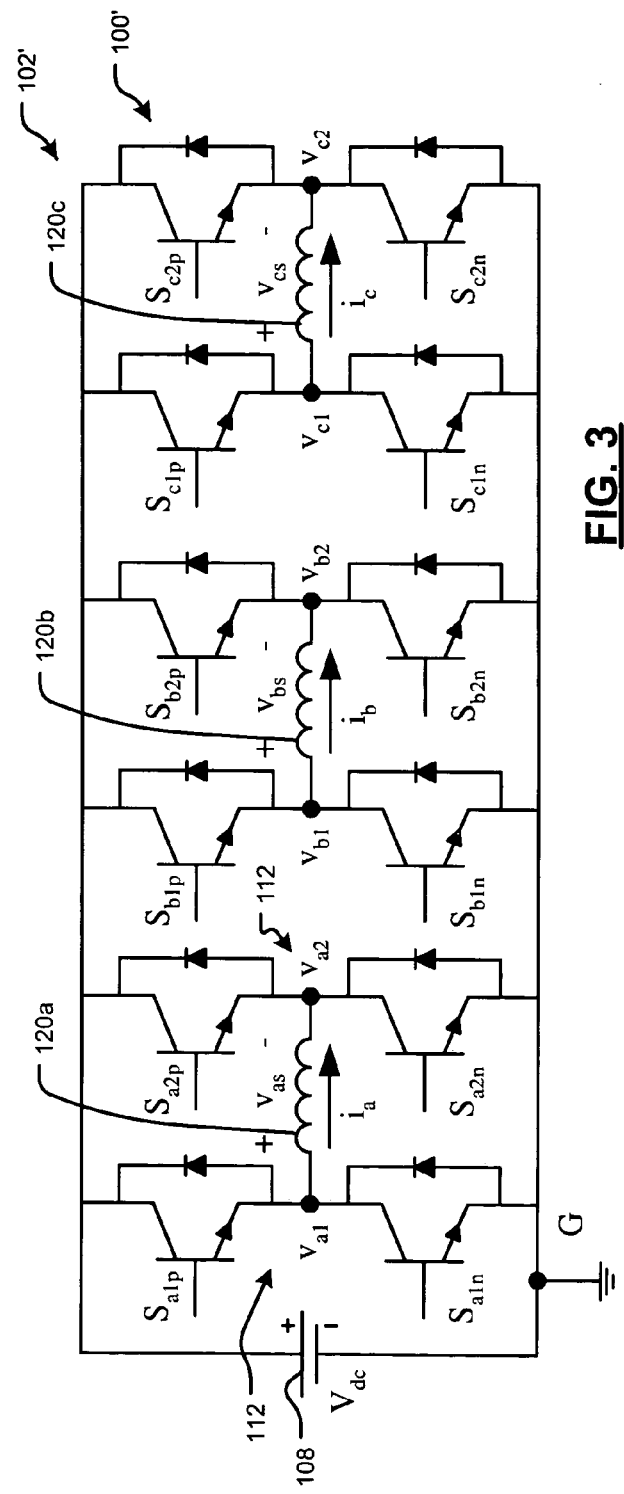
FIG. 3 is an electrical schematic of a six-leg inverter for an electric/hybrid vehicle according to the present invention.
Figure 4:
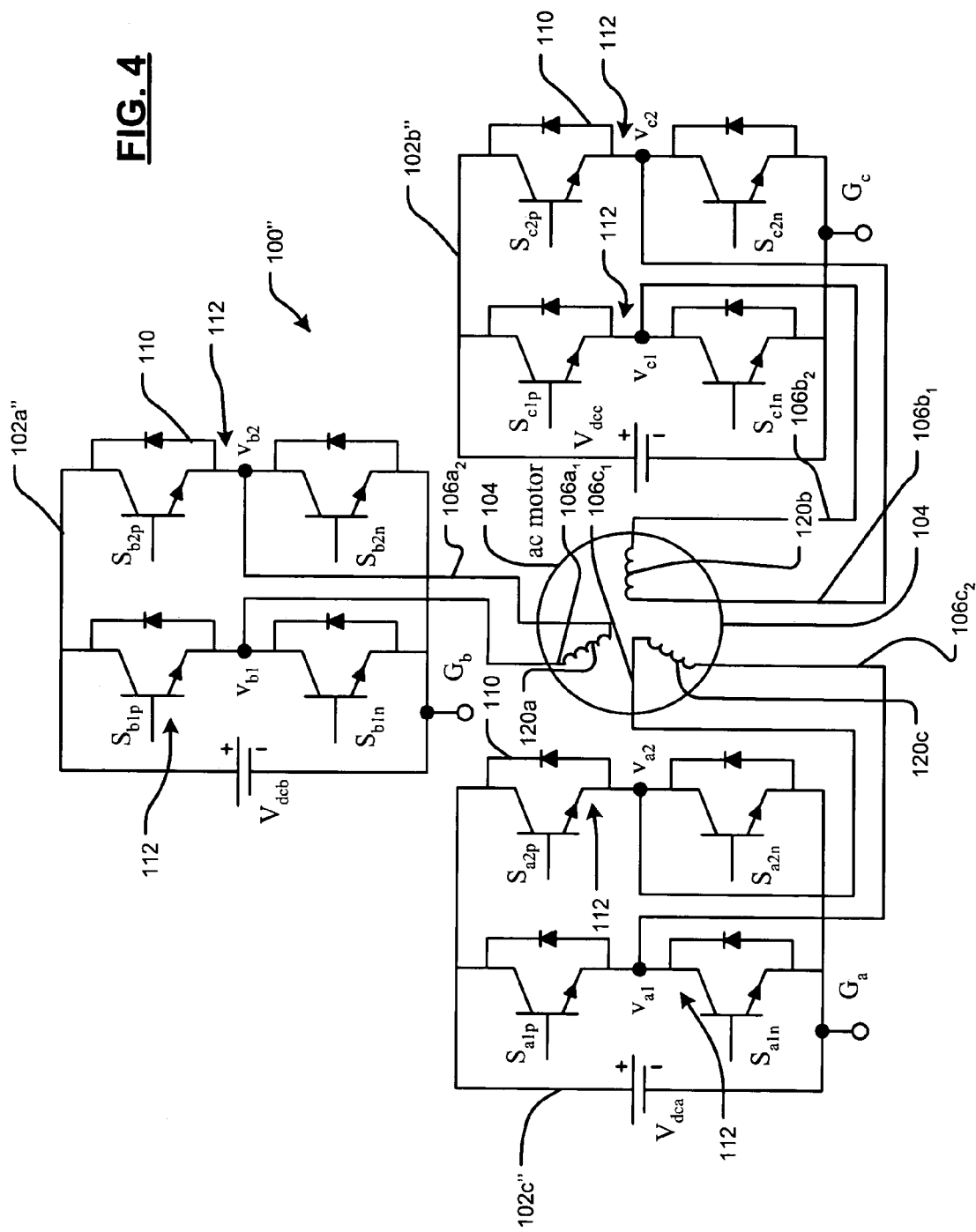
FIG. 4 is an electrical schematic of an inverter with three single-phase inverter subunits for an electric/hybrid vehicle according to the present invention.

Referring now to FIG. 3, a single six-leg inverter 102', which does not employ cascading inverter subunits, is incorporated in an EV/HEV system 100'. Each of the stator windings 120a, 120b, 120c is connected between a respective pair of inverter legs 112. Referring to FIG. 4, an inverter 102" of an EV/HEV system 100" includes three inverter subunits 102a", 102b", 102c", and each respectively connected to the windings 120a, 120b, 120c of a three-phase motor 104. Each of the inverter subunits 102a", 102b", 102c" includes two inverter legs 112 connected to the leads $106a_1$, $106a_2$, $106b_1$, $106b_2$, $106c_1$, $106c_2$, of a corresponding winding 120a, 120b, 120c.

Referring back to FIG. 2, the cascaded inverter 102 allows the full bus voltage to be applied across each phase 120a, 120b, 120c of the machine 104. Due to the zero sequence path through the DC links 108, the system 100 cannot operate in square wave mode. However, overmodulation is possible by connecting each phase load to a rail of the DC bus for 120° in each 180° half-cycle, which produces a maximum fundamental frequency output component of 1.1 pu without any triplen harmonics. This is the same voltage profile that the motor 104 would see from a delta-connected inverter 50. However, there are two key differences. The zero sequence path is now fully controlled. In addition, the inverter current is the same as the motor phase current (instead of the inverter current being increased by $\sqrt{3}$ when a delta connection is used).

Although twelve switches 110 can be utilized for the inverter 102, the number of switches will depend on the overall system design. Typically, multiple parallel MOSFETs are used to achieve the required current rating, especially in low-voltage HEV systems. As a result, the switches 110 that are needed to provide the total output kVA could just be repartitioned, with a minimal increase in the actual number of dies used.

Overall, the topologies of FIGS. 3–5 have an SUR of 0.138, which is lower than the SUR of the standard inverter 50. The inverter 102, 102'. 102", however, increases power/torque without increasing the inverter current above the baseline design by taking advantage of the higher effective DC bus voltage of the respective topology. As a result, the inverter 102, 102', 102" is particularly useful in low-voltage systems.

Figure 6:
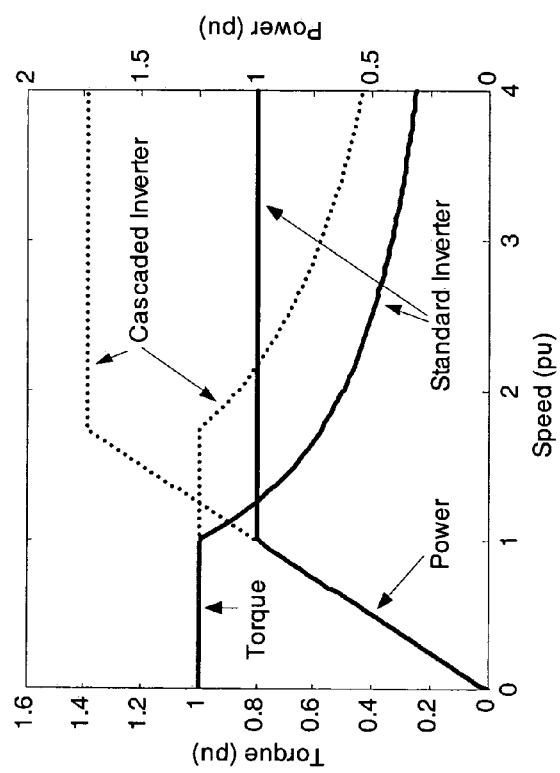
FIG. 6 is a graph illustrating comparative torque as a function of speed for inverters according to FIGS. 1 and 2 in connection with induction machines.

The following section will describe induction machine performance. The peak torque is governed by the saturation flux density of the machine's iron and the current density of the stator windings 120a, 120b, 120c. Hence, the peak torque is relatively fixed for a given machine geometry. The torque developed in the constant torque region is a function of the ampere-turns. By increasing the number of turns, the current is reduced while the motor produces the same torque. For example, doubling the number of turns reduces the current by one-half, but requires doubling the voltage. As a result, the rated speed of the machine 104, or the corner point where the machine 104 produces rated torque, occurs at the maximum available inverter voltage. For a fixed frame size and phase current, the corner point can be moved to the right by adopting the inverter 102, 102', 102" with a higher output voltage, which provides more power at high-speed. FIG. 6 shows that the high-speed power can be increased by 73% by doubling the overall inverter kVA.

With continued reference to induction machines, the cascaded inverter topology of FIG. 2 or any of the inverter topologies of FIGS. 3–5 can be used to decrease the motor phase current by $1/\sqrt{3}=0.58$ pu since the available voltage increased by $\sqrt{3}$. This would allow for a reduced conductor size, which eases the placement of the inverter 102, 102', 102" in the vehicle. In this case, the corner speed and high-speed output power would be the same as the standard configuration and the required inverter kVA is increased 15% due to the lower SUR of the cascaded topology.

The following section describes interior permanent magnet (IPM) performance. If an IPM machine 104 is used, several more options are available to the designer. Torque production in an IPM machine has both a magnetic and reluctance component, which is primarily determined by machine geometry. Changing the remanence flux density of the permanent magnets will change the magnet torque. The machine back-emf limit is one troublesome design criterion for an IPM machine used as an ISA. Due to the spinning rotor magnets, large terminal voltages are developed at high-speeds. Therefore the magnet content must be limited so that the maximum reflected voltage will not exceed the switch rating during a fault when the inverter is disconnected from the main DC supply battery and the link capacitors are charged to the peak back-emf voltage of the machine 104.

With continued reference to an IPM machine, by adopting the cascaded inverter topology of FIG. 2 or any of the inverter topologies of FIGS. 3–5, the switches 110 are connected across the phases of the machine instead of being connected across a line-line connection. The 73% increase in available bus voltage allows magnet flux to increase by the same amount without changing the back-emf limit. To illustrate the improvements that an increased magnet remanence can provide, an IPM machine was specifically designed for an ISA application with the following parameters: A three phase, 6 kW peak at 6000 rpm, 12 pole machine with $r_s \approx 0.0103$ Ω; $\Psi_{mag} \approx 6.3$ mWb; $L_d \approx 65$ μH; $L_{qmax} \approx 305$ μH; $C_1 \approx 0.0058$ H/Amp; $C_2 \approx -0.605$, where the q-axis inductance is approximated as $L_q \approx L_{qmax}$ or $C_1|i_q^e|C_2$, whichever is smaller.

Figure 7:
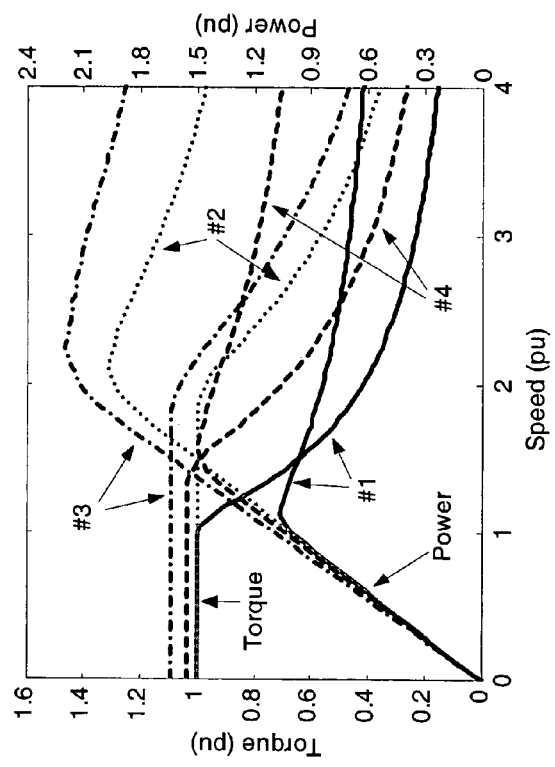
FIG. 7 is a graph illustrating predicted comparative torque as a function of speed for inverters according to FIGS. 1 and 2 in connection with IPM machines.

For simplicity, it is assumed that the machine inductances are unaffected by varying the magnet flux. FIG. 7 and TABLE I of FIG. 8 show the predicted performance of the machine. The first curve (#1) shows the unmodified machine with a 42 V bus and the inverter 50. Alternatively, curve #1 also illustrates the performance characteristics for the cascaded inverter system 100 where the turns ratio has been increased by $\sqrt{3}$. The second curve (#2) shows the same machine with the cascaded inverter 102. In this case, corner speed has increased from 700 rpm to 1300 rpm and high-speed power has increased from 7.0 kW to 16.1 kW at the expense of doubling the inverter kVA rating.

The third curve (#3) takes advantage of the winding configuration's relationship to the back-emf limit by increasing the magnet flux 73%. This results in increasing the peak torque 9% to 170 Nm, which is an important increase considering the original machine's torque production was dominated by reluctance torque (~88%). The high-speed power of the system 100 has also tripled to 21.0 kW, which is primarily attributed to the change in the corner speed.

However, the machine 104 also exhibits improved field-weakening performance as evidenced by the flatter power curve. The larger magnet content places the characteristic current closer to the optimal flux-weakening curve characterized by $\Psi_{mag}/L_d=1$ pu. Overall, this is a substantial improvement in output capabilities for a fixed size motor considering that the inverter kVA rating was only doubled.

The freedom of selecting the number of stator turns can also be used to optimize a design. The advantages of higher magnet flux, lower current, higher corner speed, and improved field-weakening characteristics can be combined in order to meet the specifications of a particular application. An example is given by curve #4 of FIG. 7, where the turns ratio has been increased by a factor N=4/3 and the PM flux has been increased $\sqrt{3}$/N. The result is a design with the corner speed increased to 940 rpm and high-speed power increased 69% to 11.8 kW. Overall, the inverter kVA has to be increased 50% to achieve these results.

The inverter 102, 102', 102" with an IPM motor also adds manufacturing flexibility. Different configurations can be adopted using a basic motor design (and footprint) for different systems. For example, the system of curve #3 of FIG. 7 can be adopted for a "heavier" hybrid vehicle, while curve #1 of FIG. 7 is better suited to a "lighter" hybrid vehicle; where heavy and light refer to the degree of electrical assistance in the vehicle.

It is important to consider the thermal aspects associated with increasing the power output of the motor. In all of the embodiments discussed above, the internal ampere-turns of the motor were held constant. As a result, the copper losses in the motor are at their nominal values. The iron losses increase somewhat due to the increased flux at the higher-speeds. Since the inverters 102, 102', 102" of FIGS. 2–5 as well as and the standard inverter 50 of FIG. 1 were operated at the same frequencies, the increase is not thermally limiting. If desired, the additional iron losses can be reduced by employing thinner laminations. Increased friction losses would occur due to the higher-power levels, which may require changes to the bearings.

The inverter topologies of FIGS. 2–5 have a switch utilization ratio of 0.138 as compared to 0.159 for the inverter 50 of FIG. 1, which indicates its relative cost is roughly 15% more. However, by adopting any of the inverter topologies of FIGS. 2–5, the overall system design space is opened up, due to a higher effective bus voltage. Taking advantage of this flexibility, an induction machine-based system 100 can be designed with an overall increase in high-speed power. An IPM motor system employing any of the inverter topologies of FIGS. 2–5 can be designed with an increased power density, increased low-speed torque, increased high-speed power, improved flux-weakening performance, and lower phase current, or a combination of these properties. Overall, the flexibility afforded by adopting one of non-standard drive topologies of FIGS. 2–5 can lead to an overall improved system design, particularly if the machine size and phase/inverter currents are constrained.

Figure 9:
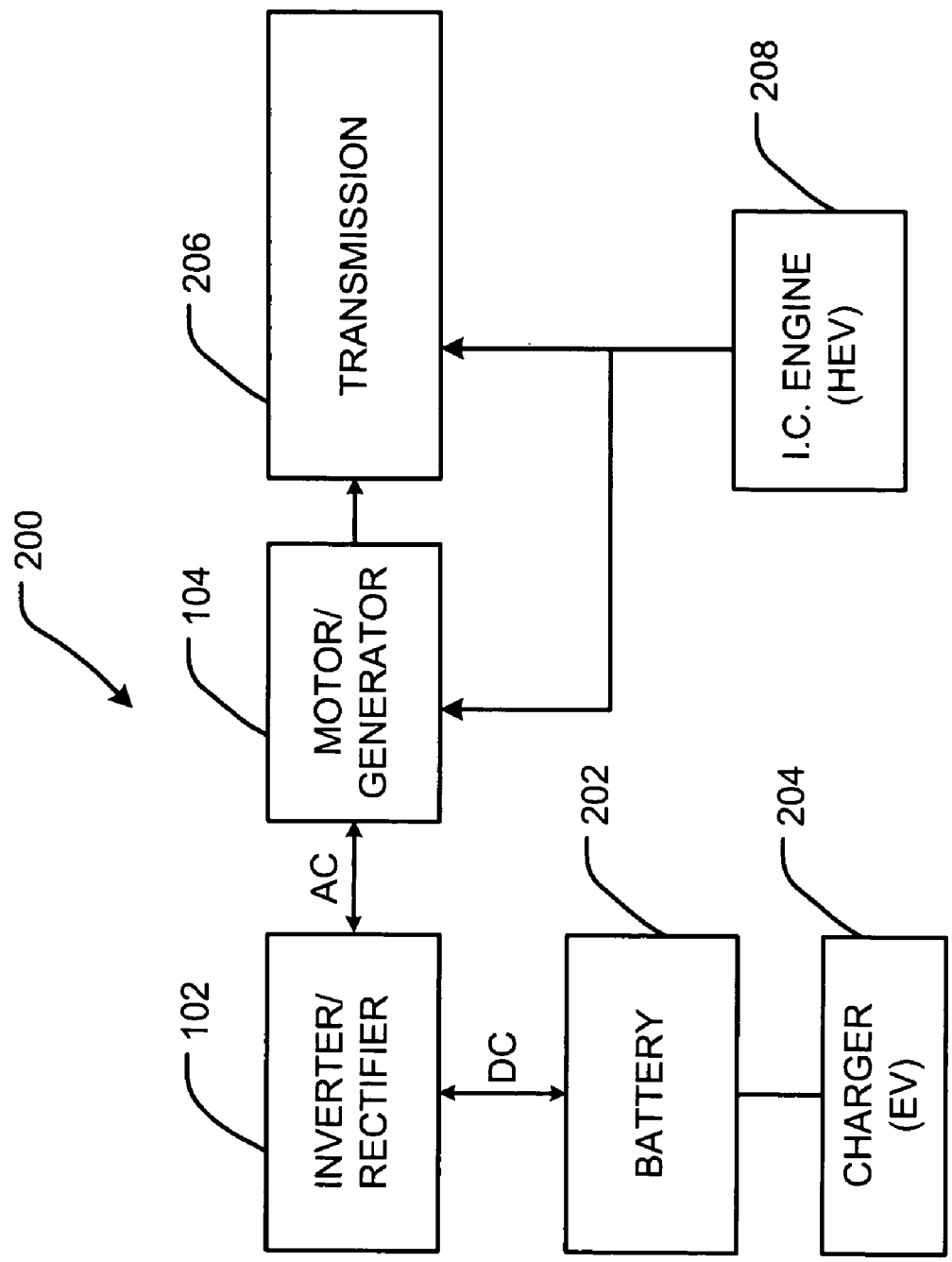
FIG. 9 illustrates an electric/hybrid vehicle system.

FIG. 9 illustrates an electric/hybrid vehicle system 200, which employs the inverter 102 (or 102', or 102"). The inverter 102 is powered by a battery system 202 chargeable with DC current. In an electric vehicle the battery system 202 can be charged by a charger 204 connected to an electric source outlet. The inverter 102 provides AC current to the motor 104, which is connected to a transmission 206 of the vehicle 200. In a hybrid electric vehicle operating in parallel, an internal combustion engine 208 is also connected to the transmission 206. In a hybrid electric vehicle operating in series, the engine 208 provides power to the motor 104 to drive the transmission 206 or, as a generator, to charge the battery system 202 through the inverter 102 operating in reverse as a rectifier. Other standard components of the vehicle are not shown.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. A hybrid/electric vehicle, comprising:
    a chargeable battery system;
    an inverter coupled to the battery system; and
    an electric AC motor coupled to the inverter, the motor having first, second and third stator windings corresponding to the first, second and third phases of the motor, wherein the inverter comprises:
        a first leg connected to a first selected one of first and second leads of the first, second, and third stator windings;
        a second leg connected to a second selected one of first and second leads of the first, second, and third stator windings;
        a third leg connected to a third selected one of first and second leads of the first, second, and third stator windings;
        a fourth leg connected to a fourth selected one of first and second leads of the first, second, and third stator windings;
        a fifth leg connected to a fifth selected one of first and second leads of the first, second, and third stator windings; and
        a sixth leg connected to a sixth selected one of first and second leads of the first, second, and third stator windings, wherein each of the inverter legs comprises first and second switches.

2. The hybrid/electric vehicle of claim 1 wherein the inverter includes first and second inverter subunits each including three of the legs.

3. The hybrid/electric vehicle of claim 2 wherein the first inverter subunit comprises the first, second and third legs and the second inverter subunit comprises the fourth, fifth and six legs, and wherein the first leg, the second leg, and the third legs are connected to the first leads of the first, second and third windings, respectively, and the fourth, fifth and sixth legs are connected to the second leads of the first, second and third windings, respectively.

4. The hybrid/electric vehicle of claim 2 wherein the battery system comprising a first DC link connect to first inverter subunit and a second DC links to the second inverted subunit.

5. The hybrid/electric vehicle of claim 4 wherein the first and second DC links are interconnected.

6. The hybrid/electric vehicle of claim 1, wherein the inverter comprises first, second and third single-phase inverter subunits.

7. The hybrid/electric vehicle of claim 6 wherein the first inverter subunit comprises the first and second legs, the second inverter subunit comprises the third and fourth legs, and the third inverter subunit comprises the fifth and sixth legs, and wherein the first and second legs are connected to the first and second leads of the first stator winding, respectively, the third and fourth legs are connected to the first and second leads of the second stator winding, respectively, and the fifth and sixth legs are connected to the first and second leads of the third stator winding, respectively.

8. The hybrid/electric vehicle of claim 1 wherein the first and second legs are connected to the first and second leads of the first stator winding, respectively, the third and fourth legs are connected to the first and second leads of the second stator winding, respectively, and the fifth and sixth legs are connected to the first and second leads of the third stator winding, respectively.

9. The hybrid/electric vehicle of claim 1 wherein the motor is an interior permanent magnet motor.

10. The hybrid/electric vehicle of claim 1 wherein the motor is an induction motor.

11. A hybrid/electric vehicle comprising:
a battery system that is connected to a DC charger;
an inverter coupled to the battery system; and
an electric AC motor coupled to the inverter, the motor having first, second and third stator windings corresponding to first, second and third phases of the motor, each stator winding having first and second leads, and wherein the inverter comprises at least twelve switches, the switches connected to provide current to the stator windings at the first and second leads.

12. The hybrid/electric vehicle of claim 11 wherein the motor is an induction machine.

13. The hybrid/electric vehicle of claim 11 wherein the three-phase machine is an internal permanent magnet machine.

14. The hybrid/electric vehicle of claim 11 wherein the switches are grouped into two inverter subunits defining a cascaded inverter.

15. The hybrid/electric vehicle of claim 14 wherein each inverter subunit comprises three pairs of switches.

16. The hybrid/electric vehicle of claim 11 wherein the switches are grouped into three inverter subunits, each inverter subunit comprising four switches.

17. The hybrid/electric vehicle of claim 16 wherein each inverter subunit is connected to the first and second leads of a respective stator winding.

18. A method for supplying three-phase electric power to a three phase electric motor for a vehicle, the electric motor having three windings, each winding having first and second leads, the method comprising:
providing an inverter having at least six pairs of switches; and
connecting each of the first and second leads of each winding to a separate pair of switches.

* * * * *